US012708194B2

(12) United States Patent
Davis

(10) Patent No.: US 12,708,194 B2
(45) Date of Patent: Aug. 18, 2026

(54) MAGNETIC ACCESSORY HOLDER

(71) Applicant: Karris Davis, Sandy, UT (US)

(72) Inventor: Karris Davis, Sandy, UT (US)

( * ) Notice: Subject to any disclaimer, the term of this patent is extended or adjusted under 35 U.S.C. 154(b) by 105 days.

(21) Appl. No.: 18/600,207

(22) Filed: Mar. 8, 2024

(65) Prior Publication Data

US 2025/0280943 A1 Sep. 11, 2025

(51) Int. Cl.

| | |
|---|---|
| ***A45F 5/02*** | (2006.01) |
| ***A63B 57/20*** | (2015.01) |
| ***F16M 13/02*** | (2006.01) |
| *A45F 5/00* | (2006.01) |

(52) U.S. Cl.
CPC .............. *A45F 5/02* (2013.01); *A63B 57/203* (2015.10); *F16M 13/022* (2013.01); *A45F 5/1508* (2025.01); *A45F 5/1575* (2025.01); *A63B 2209/08* (2013.01)

(58) Field of Classification Search
CPC .... A45F 5/1508; A45F 5/1575; A63B 57/203; A63B 2209/08; F16M 13/022; F16L 3/00; F16L 3/20; F16L 3/23
See application file for complete search history.

(56) References Cited

U.S. PATENT DOCUMENTS 3,190,599 A * 6/1965 Margulis .............. A47G 1/1653 248/223.41
4,559,675 A * 12/1985 Devenny ................... A45F 5/08 24/5
5,347,733 A * 9/1994 Whittington .............. G09F 7/04 40/1.5
5,682,648 A * 11/1997 Miller ....................... A45F 5/08 63/29.2
6,079,765 A * 6/2000 Zaguskin ................ B60R 16/02 248/68.1
6,282,760 B1 9/2001 Mars
6,325,336 B1 * 12/2001 Coykendall ............... F16L 3/04 248/68.1
6,367,126 B1 4/2002 Rivkin
6,431,500 B1 * 8/2002 Jacobs ...................... F16L 3/13 248/51
6,446,372 B1 9/2002 Reeves
6,491,271 B1 * 12/2002 Adams .................. F16B 45/008 248/304
6,855,890 B1 * 2/2005 Vasichek .................. H02G 3/30 248/65
7,120,972 B2 10/2006 O' Banion
(Continued)

*Primary Examiner* — Monica E Millner
(74) *Attorney, Agent, or Firm* — Tono Law Group, LLC

(57) ABSTRACT

A magnetic accessory holder can include a backing plate and a retaining bracket attached magnetically to each other. The backing plate can include an elongated body with a first set of magnets embedded in the body. The retaining bracket can include an outer surface and an inner surface, each of which extends between the top and bottom surfaces of the retaining bracket. The inner surface can include elongated channels each of which forms a receptacle extending from the top surface to the bottom surface of the retaining bracket. The retaining bracket can also include a second of magnets, where the magnets of the first set and of the second set are positioned to align with each other to fasten the retaining bracket to the backing plate by magnetic attraction, and where each receptacle is configured to receive a protruding portion of an electronics accessory.

20 Claims, 8 Drawing Sheets

(56) References Cited

U.S. PATENT DOCUMENTS

| | | | | | |
|---|---|---|---|---|---|
| 7,424,216 | B2 | | 9/2008 | Liem | |
| 7,740,215 | B2 | * | 6/2010 | Lang | A47F 7/22 248/206.5 |
| 7,770,851 | B2 | * | 8/2010 | Michaud | F16L 3/04 248/65 |
| 8,235,262 | B1 | * | 8/2012 | Sakdol | A42B 3/04 224/183 |
| 9,124,053 | B2 | * | 9/2015 | Metras | H01R 13/60 |
| D756,631 | S | * | 5/2016 | Praamsma | D3/219 |
| 10,172,401 | B1 | | 1/2019 | Hopper | |
| 10,624,441 | B1 | * | 4/2020 | Sullivan | B43K 19/14 |
| 10,835,022 | B2 | | 11/2020 | Byrnes | |
| 10,943,514 | B1 | * | 3/2021 | O'Keefe | G09F 7/10 |
| 11,151,908 | B2 | * | 10/2021 | Kott | G09F 3/20 |
| 12,317,921 | B2 | * | 6/2025 | Kracl | A24F 13/22 |
| 2004/0200043 | A1 | | 10/2004 | Wong | |
| 2005/0262666 | A1 | | 12/2005 | McIntosh | |
| 2005/0263651 | A1 | * | 12/2005 | Duponchelle | H02G 3/30 248/65 |
| 2008/0054033 | A1 | * | 3/2008 | Synness | A42B 1/24 224/181 |
| 2009/0238395 | A1 | * | 9/2009 | Jubelirer | H04R 1/10 381/370 |
| 2009/0320247 | A1 | * | 12/2009 | Honeycutt | A41D 1/002 24/129 R |
| 2013/0200117 | A1 | * | 8/2013 | Monro | A45F 5/02 224/183 |
| 2014/0033394 | A1 | * | 2/2014 | Stauffer | A45F 5/02 24/3.12 |
| 2016/0047494 | A1 | * | 2/2016 | Dickinson | F16G 11/143 248/74.1 |

* cited by examiner

MAGNETIC ACCESSORY HOLDER

TECHNICAL FIELD

The implementations of the disclosure relate generally to accessory retaining devices. More specifically, the embodiments disclosed herein relate to magnetic accessory holders that can be attached to items of clothing.

BACKGROUND

In today's fast-paced world, wireless technology and small accessories, particularly earbuds and small sport equipment, play a crucial role in daily communication and entertainment. However, users frequently face the inconvenience and financial burden of losing their small accessories (e.g., wireless earbuds, writing utensils, golf tees, etc.) due to the lack of a secure and accessible storage solution when not in use. Recognizing the need for a more efficient way to keep small accessories and electronics readily available without resorting to carrying bulky cases or risking loss by placing them loosely in pockets, the embodiments disclosed herein introduce a novel approach to integrating accessory storage directly with clothing and other apparel, such as hats, offering an innovative solution to the common problem of accessory misplacement. Existing solutions are inadequate to address the need for a combination of ease of access, comfort, and secure storage. The embodiments of the present disclosure not only provide users with a simple, stylish way to store their accessories directly on their person but also significantly reduces the likelihood of loss or damage, ultimately saving users time and money. By reimagining how accessories can be carried and accessed, the various embodiments further described in more detail below, set out a new approach for the integration of personal technology with everyday apparel and accessories, marking a significant advancement in the field of accessory holders. By implementing the various embodiments disclosed herein, users can enjoy the convenience of having their accessories within easy reach at all times, ready to be used or stored in a moment's notice, without the hassle of traditional carrying cases or the risk of misplacement, thus revolutionizing the user experience in interacting with their accessories such as wireless audio devices.

SUMMARY OF THE DISCLOSURE

Embodiments of the present disclosure describe apparatuses for holding accessories and attaching them to layers of materials such as items of clothing.

Embodiments of the present disclosure can include a magnetic accessory holder that has a backing plate including an elongated body where a first set of magnets is at least partially embedded in the body of the backing plate. In some embodiments, each magnet of the first set of magnets can be partially embedded in the elongated body of the backing plate and can also be partially protruding from the body of the backing plate. The magnetic accessory holder can also have a retaining bracket that has an outer surface and an inner surface where each of the outer surface and the inner surface extend between a top surface and a bottom surface of the retaining bracket. The inner surface can define one or more elongated channels where each elongated channel forms a receptacle extending from the top surface to the bottom surface of the retaining bracket. Each receptacle can be separated from another receptacle by a portion of the retaining bracket.

In some embodiments, the retaining bracket of the magnetic accessory holder can include a second set of magnets, where each magnet in the second set of magnets is positioned to align with at least one magnet of the first set of magnets that is at least partially embedded in the body of the backing plate. In some embodiments, each set of magnets can include three or more magnets. The aligned sets of magnets can fasten the retaining bracket to the backing plate by magnetic attraction and each receptacle can be configured to receive a protruding portion of an electronics accessory. In some embodiments each receptacle can be shaped as a partially open cylindrical tube.

In some of these embodiments, the retaining bracket can also include a lip extending perpendicularly relative to a length between the top surface and the bottom surface and at least one magnet of the second set of magnets can be embedded in the lip. In the embodiments, the inner surface of the retaining bracket can be a textured surface.

Other embodiments of the present disclosure can include a magnetic accessory holder that has a substantially flat backing plate having an elongated body and a first set of magnets including at least one magnet that is at least partially embedded in the body of the substantially flat backing plate. The embodiments of the magnetic accessory holder can also include a retaining bracket configured to magnetically attach to the substantially flat backing plate through a layer of intervening material.

The retaining bracket can include a top surface, a bottom surface, an outer surface extending between the top surface and the bottom surface, where the outer surface has multiple curved areas. The retaining bracket can also include an inner surface extending between the top surface and the bottom surface where a portion of the inner surface defines a one or more concave walls and where each concave wall defines an elongated receptacle and extends between the top surface and the bottom surface. Each receptacle can be shaped as a prismoidal partially open tube. In some embodiments, each magnet of the first set of magnets can be fully embedded in the backing plate such that an exposed surface of the magnet is flush with a surface of the backing plate.

The retaining bracket can also include multiple tabs where each tab respectively extends from an end of a corresponding curved area of the outer surface and where each tab includes magnetic material. Each tab can be respectively positioned to align with a corresponding magnet of the first set of magnets on the substantially flat backing plate to fasten the retaining bracket to the backing plate by magnetic attraction, and each receptacle can be configured to receive a protruding portion of a sport accessory.

In some of these embodiments, the magnetic accessory holder also includes a second set of magnets, where a magnet of the second set of magnets is respectively attached to a corresponding tab of the retaining bracket and protrudes perpendicularly relative to the inner surface of the retaining bracket. In some embodiments, each tab can be a magnet. The retaining bracket can also include a conformal layer attached along the inner surface of the retaining bracket and the conformal layer can include a textured surface. In these embodiments the sport accessory that each receptacle is configured to receive can be an ear bud or a golf tee.

Still other embodiments of the present disclosure can include an accessory holder that has a backing plate, a first set of magnets affixed to the backing plate, and a retaining bracket with a body having multiple flat surfaces and multiple curved surfaces disposed along the body. The surfaces can be disposed along the body such that a curved surface alternates with a flat surface along the length of the body of the retaining bracket, and where each curved surface defines a partially open tubular channel forming a receptacle configured to receive a protruding portion of an accessory. In some embodiments, the accessory holder can include a second set of magnets affixed to the retaining bracket, where each magnet of the second set of magnets is respectively aligned with a corresponding magnet of the first set of magnets to fasten the retaining bracket to the backing plate by magnetic attraction through a layer of intervening material. In some embodiments, at least two flat surfaces of the body of the retaining bracket each respectively extend along a portion of a lip extending away from an exterior curved surface of the body of the retaining bracket away from a longitudinal axis of the partially open tubular channel formed by an interior curved surface of the retaining bracket. In these or other embodiments, each curved surface can be a textured surface that is textured with grooves or protrusions. In some of these embodiments, the accessory can be a wireless earbud, a golf tee, a screwdriver, pliers, a writing utensil, a dining utensil, or a similar object having an elongated protrusion.

These and other embodiments are described in more detail in the following detailed description.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only. One of ordinary skill in the art would appreciate that these are merely example embodiments, and that additional and alternative embodiments may exist and still be within the spirit of the disclosure as described herein.

The disclosure will provide details in the following description of preferred embodiments with reference to the following figures wherein.

DETAILED DESCRIPTION

Figure 1A:
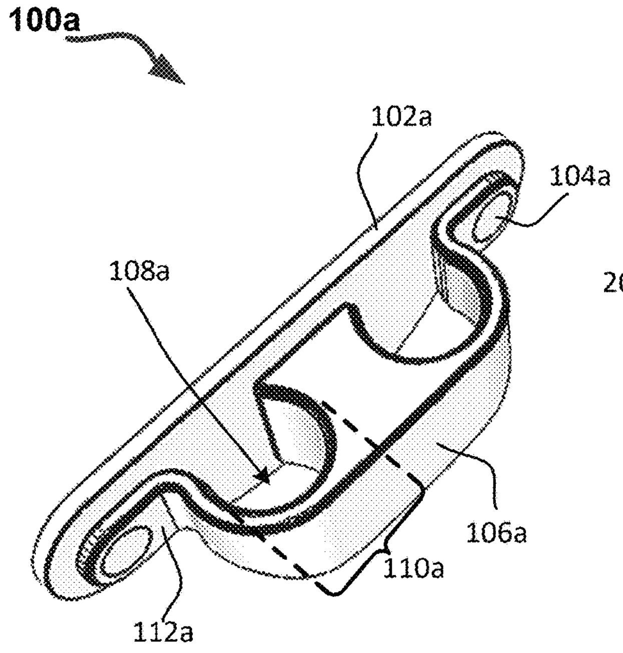
FIG. 1A is a front perspective view of a magnetic accessory holder in accordance with some embodiments of the present disclosure.

In the Summary above and in this Detailed Description, and the claims below, and in the accompanying drawings, reference is made to particular features of various embodiments of the invention disclosed herein. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

Reference in this specification to "one embodiment" or "an embodiment" of the present invention, as well as other variations thereof, means that a particular feature, structure, characteristic, and so forth described in connection with the embodiment is included in at least one embodiment of the invention. Thus, the appearances of the phrase "in one embodiment" or "in an embodiment", as well any other variations, appearing in various places throughout the specification are not necessarily all referring to the same embodiment.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present description, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present description does not explicitly recite each and every permutation that may be obtained by choosing from the set of optional features. However, the present description is to be interpreted as explicitly disclosing all such permutations. For example, a device described as having three optional features may be embodied in seven different ways, namely with just one of the three possible features, with any two of the three possible features or with all three of the three possible features.

In the present description, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

It will also be understood that when an element is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected", "mounted", "affixed", "attached", or "coupled" to another element, it can be directly connected, mounted, affixed, attached, or coupled to the other element or intervening elements can be present. In contrast, when an element is referred to as being "directly connected", "directly mounted", or "directly coupled" to another element, there are no intervening elements present. It should be understood that the terms "connected", "mounted", "affixed", "attached", or "coupled" are used interchangeably herein.

Aspects and implementations of the instant disclosure address the above noted and other deficiencies of the existing technology by enabling the secure retention of various accessories to close and fabric as well as other similar articles in a convenient and easily accessible manner. For example, wireless headphones can be securely inserted into the receptacles of the accessory holder and easily accessed for use or storage in the various embodiments of the present disclosure. In another example implementation, golf tees can be securely inserted into the receptacles of the accessory holder and easily accessed for use or storage in the various embodiments of the present disclosure. Similarly, other items, utensils, and accessories conforming to the elongated receptacle shape (e.g., pens, pencils, eyeglasses, etc.) can likewise be securely stored or held by the receptacles of the accessory in the various embodiments described herein.

Figure 2A:
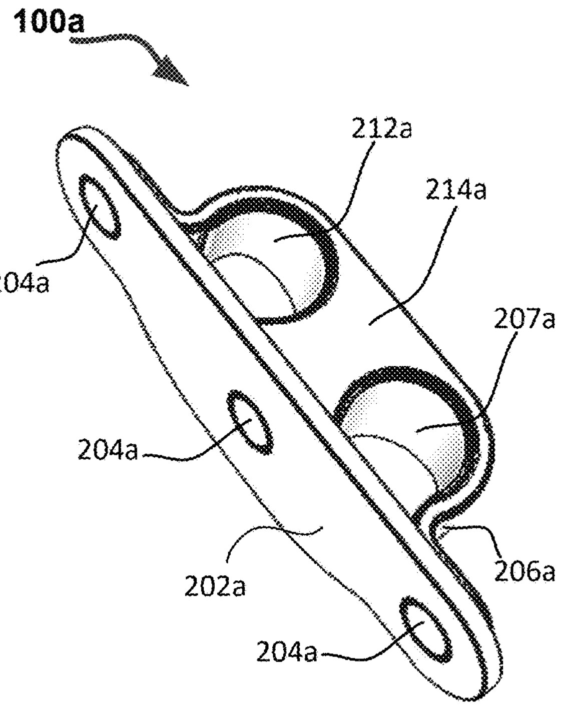
FIG. 2A is a rear perspective view of a magnetic accessory holder in accordance with some embodiments of the present disclosure.
Figure 1B:
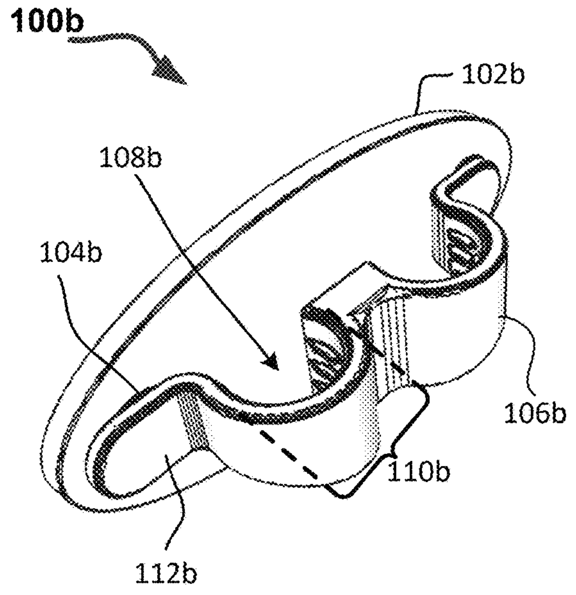
FIG. 1B is a front perspective view of a magnetic accessory holder in accordance with some embodiments of the present disclosure.
Figure 2B:
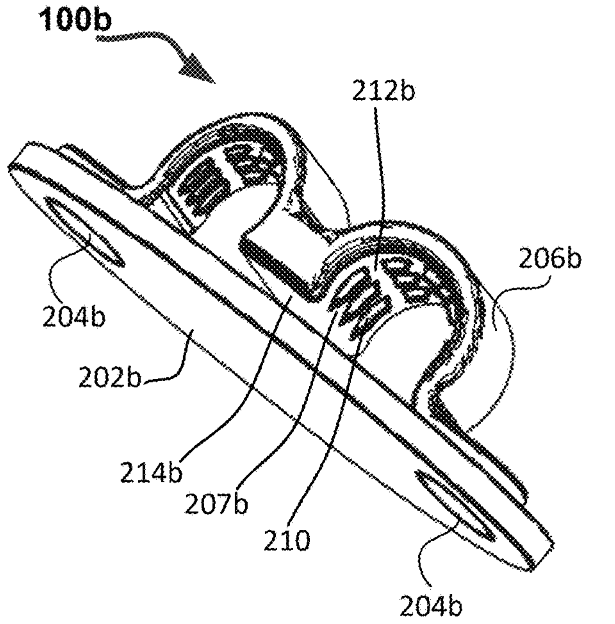
FIG. 2B is a rear perspective view of a magnetic accessory holder in accordance with some embodiments of the present disclosure.
Figure 4A:
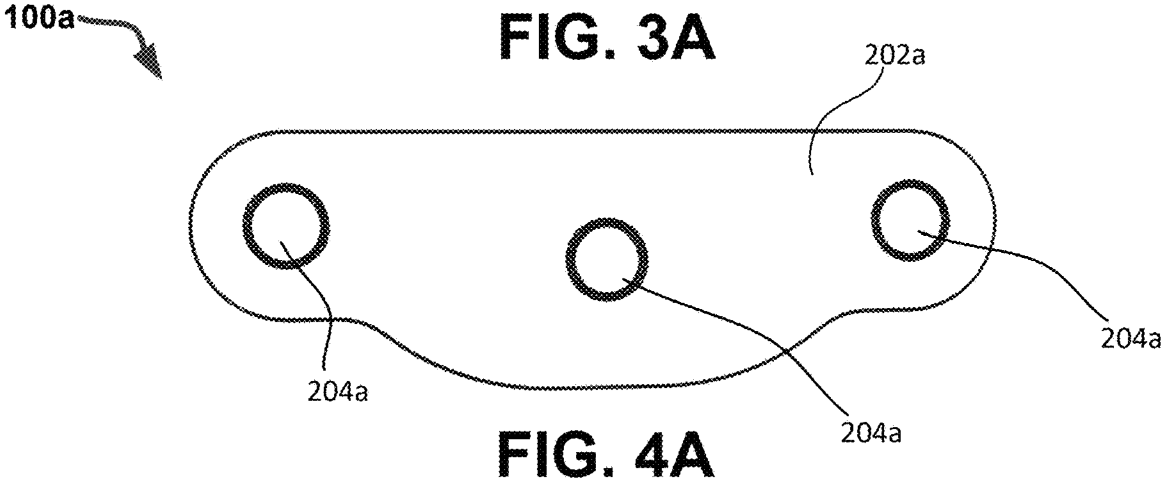
FIG. 4A is a rear view of a magnetic accessory holder in accordance with some embodiments of the present disclosure.

Initially, FIG. 1A offers a front perspective view of a magnetic accessory holder 100*a*, while FIG. 2A shows a rear perspective view of a magnetic accessory holder 100*a*, respectively in accordance with some embodiments of the present disclosure. Similarly, FIGS. 2A-2B respectively illustrate a front perspective view of a magnetic accessory holder 100*b* and a rear perspective view of a magnetic accessory holder 100*b*, in accordance with various embodiments. These embodiments of the present disclosure can include a magnetic accessory holder 100*a*, 100*b* that has a backing plate 102*a*, 102*b* including an elongated backing plate body 202*a*, 202*b*. The backing plate body 202*a*, 202*b* can have a first set of magnets, where each magnet 204*a*, 204*b* is at least partially embedded in the body 202*a*, 202*b* of the backing plate 102*a*, 102*b*. In some embodiments, each magnet 204*a*, 204*b* of the first set of magnets can be partially embedded in the elongated body 202*a*, 202*b* of the backing plate and can also be partially protruding from the backing plate body 202*a*, 202*b*.

The magnetic accessory holder 100*a*, 100*b* can also have a retaining bracket 106*a*, 106*b* that has an outer surface 206*a*, 206*b* and an inner surface 207*a*, 207*b* where each of the outer surface 206*a*, 206*b* and the inner surface 207*a*, 207*b* extend between a top surface and a bottom surface of the retaining bracket. The inner surface 207*a*, 207*b* can define one or more elongated channels 108*a*, 108*b* where each elongated channel 108*a*, 108*b* forms a receptacle 110*a*, 110*b* extending from the top surface to the bottom surface of the retaining bracket 106*a*, 106*b*. The top and bottom surfaces are described in more detail below with reference to FIGS. 7A-8B. Each receptacle 110*a*, 110*b* can be separated from another receptacle by a portion of the retaining bracket as further described with reference to FIGS. 8A-8B.

In some embodiments, the retaining bracket 106*a*, 106*b* of the magnetic accessory holder 100*a*, 100*b* can include a second set of magnets, where each magnet 104*a*, 104*b* in the second set of magnets is positioned to align with at least one magnet 204*a*, 204*b* of the first set of magnets, where each magnet 204*a*, 204*b* is at least partially embedded in the body 202*a*, 202*b* of the backing plate 102*a*, 102*b*. In some embodiments, each set of magnets can include one or more (e.g., two, three, four, etc.) magnets 204*a*, 204*b*. While depicted as circular in cross-section and cylindrical in shape, it is contemplated that the magnets 104*a*, 104*b*, 204*a*, 204*b* can be of any suitable shape (e.g., prismoidal or substantially flat) and cross-section (e.g., square, rectangular, elliptical, oval, triangular, hexagonal, octagonal, or in the shape of any other regular or irregular polygon). The aligned sets of magnets can fasten the retaining bracket 106*a*, 106*b* to the backing plate 102*a*, 102*b* by magnetic attraction. In these and other embodiments, each receptacle 110*a*, 110*b* can be configured to receive a protruding portion of an electronics accessory as shown in more detail in FIG. 17. In some embodiments, each receptacle 110*a*, 110*b* can be shaped as a partially open cylindrical tube.

In some of these embodiments, the retaining bracket 106*a*, 106*b* can also include a lip 112*a*, 112*b* extending perpendicularly relative to a length between the top surface and the bottom surface of the retaining bracket 106*a*, 106*b*. Additionally, in some embodiments, at least one magnet 104*a* of the second set of magnets can be embedded in the lip 112*a* of the retaining bracket 106*a*. In these or other embodiments, the inner surface 207*b* of the retaining bracket 106*b* can be a textured surface.

With continued reference to FIGS. 1A-2B and turning to FIGS. 3A-4B which each respectively illustrate either a front view or a rear view of a magnetic accessory holder 100*a*, 100*b* in accordance with some embodiments. These several embodiments can include a magnetic accessory holder 100*a*, 100*b* that has a substantially flat backing plate 102*a*, 102*b* having an elongated body 202*a*, 202*b* and a first set of magnets including at least one magnet 204*a*, 204*b* that is at least partially embedded in the body 202*a*, 202*b* of the substantially flat backing plate 102*a*, 102*b*.

The embodiments of the magnetic accessory holder 100*a*, 100*b* can also include a retaining bracket 106*a*, 106*b* configured to magnetically attach to the substantially flat backing plate 102*a*, 102*b* through a layer of intervening material (e.g., cloth, textile, paper, polymer, wood). The retaining bracket 106*a*, 106*b* can include a top surface, a bottom surface, and an outer surface 206*a*, 206*b* extending between the top surface and the bottom surface, where the outer surface 206*a*, 206*b* has multiple curved areas. Furthermore, the retaining bracket 106*a*, 106*b* can also include an inner surface 207*a*, 207*b* extending between the top surface and the bottom surface of the retaining bracket 106*b*. In these embodiments, a portion of the inner surface 207*a*, 207*b* can define one or more concave walls, where each concave wall defines an elongated receptacle 110*a*, 110*b* and extends between the top surface and the bottom surface of the retaining bracket 106*a*, 106*b*. The top and bottom surfaces are described in more detail below with reference to FIGS. 7A-8B. Each receptacle 110*a*, 110*b* can be shaped as a prismoidal partially open tube. In some embodiments, each magnet 204*a*, 204*b* of the first set of magnets can be fully embedded in the backing plate 102*a*, 102*b* such that an exposed surface of the magnet is flush with a surface of the backing plate 102*a*, 102*b*. In other embodiments, each magnet 204*a*, 204*b* of the first set of magnets can either be partially embedded in the backing plate 102*a*, 102*b* or attached on a surface of the backing plate 102*a*, 102*b* such that each magnet 204*a*, 204*b* extends beyond the surface of the backing plate 102*a*, 102*b*.

With continued reference to FIGS. 1A-4B, the retaining bracket 106*a*, 106*b* can also include multiple tabs 322*a*, 322*b* where each tab 322*a*, 322*b* respectively extends from an end of a corresponding curved area of the outer surface 206*a*, 206*b*. In the several embodiments, each tab 322*a*, 322*b* can include magnetic material or have one or more magnets 104*a*, 104*b* embedded within it or affixed to it. A magnet 104*a*, 104*b* of the second set of magnets can either be partially embedded in a tab 322*a*, 322*b* or attached on a surface of the tab 322*a*, 322*b* such that the magnet 104*a*, 104*b* extends beyond the surface of the tab 322*a*, 322*b*. Each tab 322*a*, 322*b* can respectively form a part of a corresponding lip 112*a*, 112*b* and can respectively be positioned to align with a corresponding magnet 204*a*, 204*b* of the first set of magnets on the substantially flat backing plate to fasten the retaining bracket 106*a*, 106*b* to the backing plate 102*a*, 102*b* by magnetic attraction. In the various embodiments, each receptacle 110*a*, 110*b* can be configured to receive a protruding portion of a sport accessory.

In some of these embodiments, the magnetic accessory holder 100*a*, 100*b* can also include a second set of magnets, where a magnet 104*a*, 104*b* of the second set of magnets is respectively attached to a corresponding tab 322*a*, 322*b* of the retaining bracket. The magnet 104*a*, 104*b* attached to the tab 322*a*, 322*b* can protrude or extend perpendicularly relative to the inner surface of the retaining bracket 106*a*, 106*b* (i.e., toward the backing plate 102*a*, 102*b*). In some embodiments, each tab 322*a*, 322*b* can be a magnet. In some embodiments, one or more of the magnets 104*a*, 104*b* of the retaining bracket 106*a*, 106*b* can respectively be positioned to align with a corresponding one or more magnets 204*a*, 204*b* on the substantially flat backing plate 102*a*, 102*b* to fasten the retaining bracket 106*a*, 106*b* to the backing plate 102*a*, 102*b* by magnetic attraction. In some of these embodiments the sport accessory that each receptacle is configured to receive can be an ear bud or a golf tee.

Figure 3A:
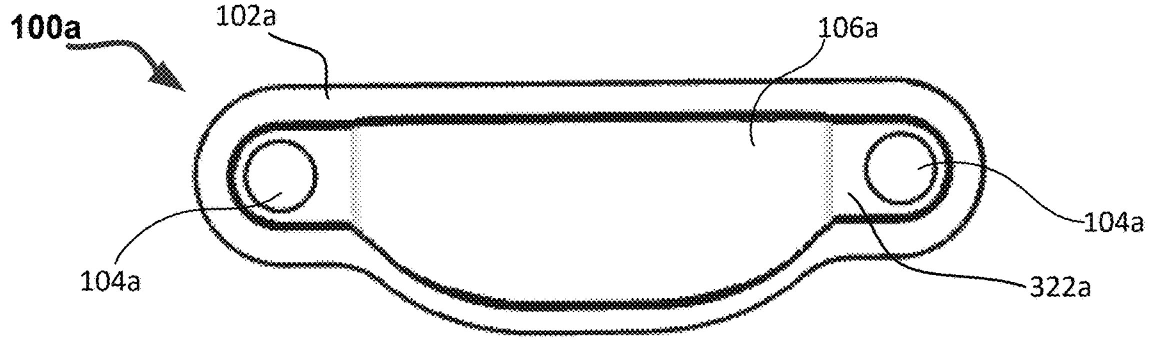
FIG. 3A is a front view of a magnetic accessory holder in accordance with some embodiments of the present disclosure.
Figure 3B:
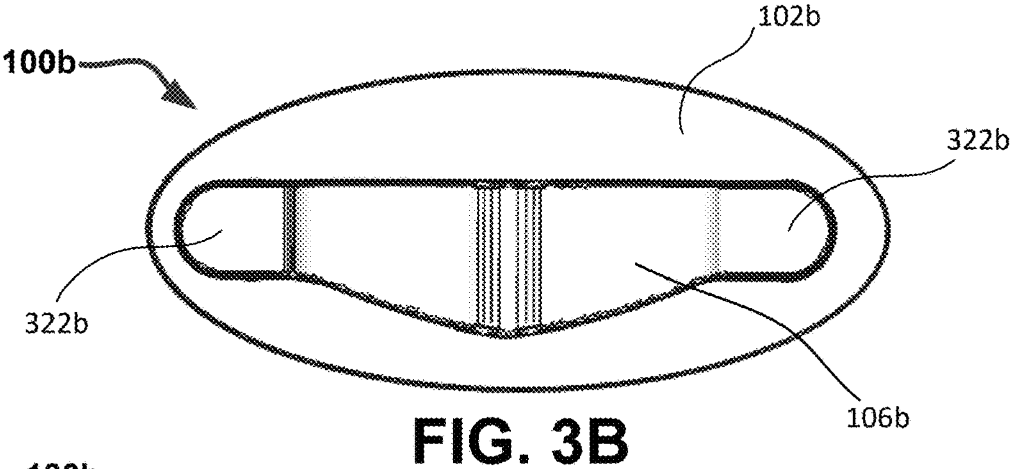
FIG. 3B is a front view of a magnetic accessory holder in accordance with some embodiments of the present disclosure.
Figure 4B:
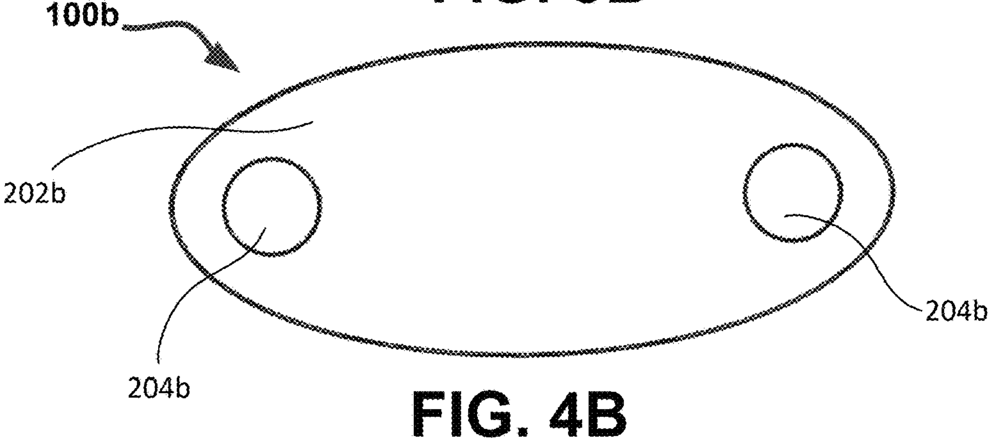
FIG. 4B is a rear view of a magnetic accessory holder in accordance with some embodiments of the present disclosure.

It is contemplated that, in the various embodiments, the backing plate body 202*a*, 202*b*, can be formed in a variety of different substantially flat shapes. For example, the backing plate body 202*a*, 202*b*, can be formed in a substantially circular or oval shape, as well as in an elliptical shape as depicted in FIGS. 3B and 4B. In some embodiments, the backing plate body 202*a*, 202*b*, can be formed in a rectangular or triangular shape or in a shape of any regular or irregular polygon (e.g., semi-circular, polygonal with rounded corners, etc.) The one or more magnets 204*a*, 204*b* can be disposed in various location in or on the backing plate body 202*a*, 202*b*. Additional details are described further with reference to FIGS. 5A-6B.

Figure 6A:
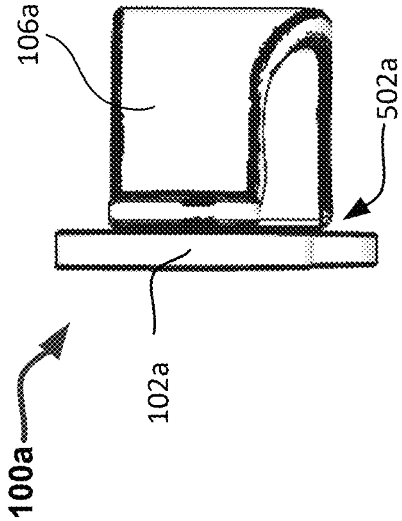
FIG. 6A is a left side view of a magnetic accessory holder in accordance with some embodiments of the present disclosure.
Figure 6B:
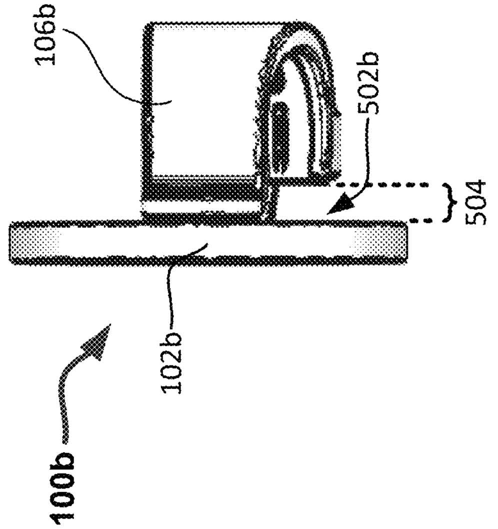
FIG. 6B is a left side view of a magnetic accessory holder in accordance with some embodiments of the present disclosure.
Figure 5A:
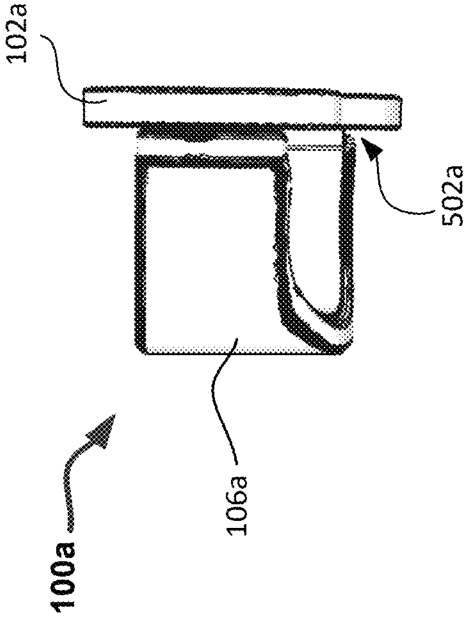
FIG. 5A is a right side view of a magnetic accessory holder in accordance with some embodiments of the present disclosure.
Figure 5B:
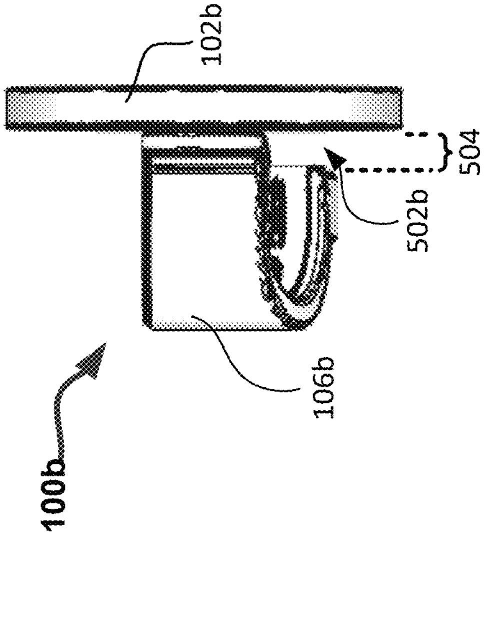
FIG. 5B is a right side view of a magnetic accessory holder in accordance with some embodiments of the present disclosure.
Figure 7A:
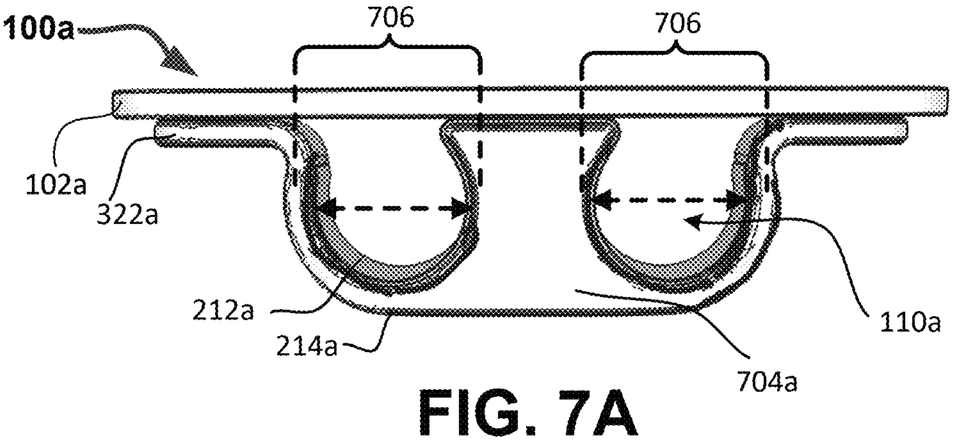
FIG. 7A is a top view of a magnetic accessory holder in accordance with some embodiments of the present disclosure.

FIGS. 5A-5B each respectively depict a right side view of a magnetic accessory holder 100*a*, 100*b* in accordance with an embodiments of the present disclosure, while FIGS. 6A-6B each respectively depict a left side view of the magnetic accessory holder 100*a*, 100*b* in accordance with some embodiments. In some embodiments, when the retaining bracket 106*a* is connected to the backing plate 102*a*, the retaining bracket 106*a* can be in contact with the backing plate 102*a* in a region 502*a* between a flat surface of the retaining bracket 106*a* and the backing plate 102*a*. In other embodiments, when the retaining bracket 106*b* is connected to the backing plate 102*b*, the retaining bracket 106*b* can be separated from the backing plate 102*b* in a region 502*b* by an offset distance 504 between a flat surface of the retaining bracket 106*b* and the backing plate 102*b*.

Figure 8A:
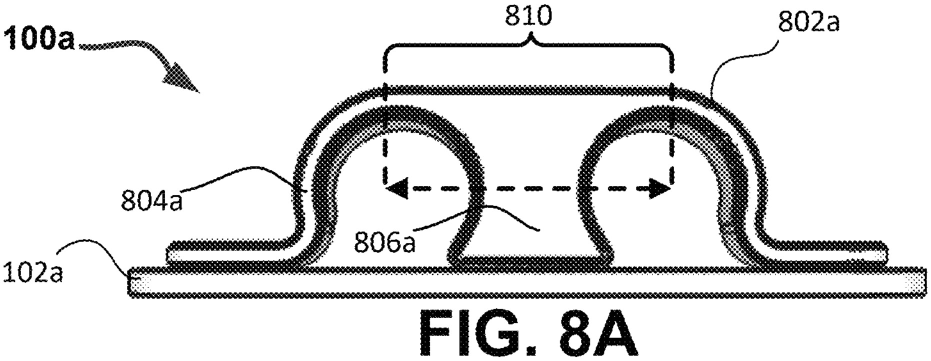
FIG. 8A is a top view of a magnetic accessory holder in accordance with some embodiments of the present disclosure.
Figure 7B:
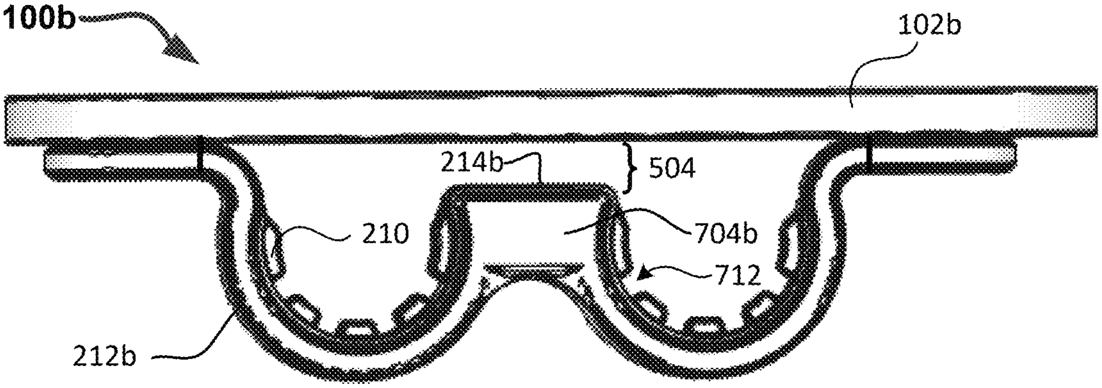
FIG. 7B is a bottom view of a magnetic accessory holder in accordance with some embodiments of the present disclosure.
Figure 8B:
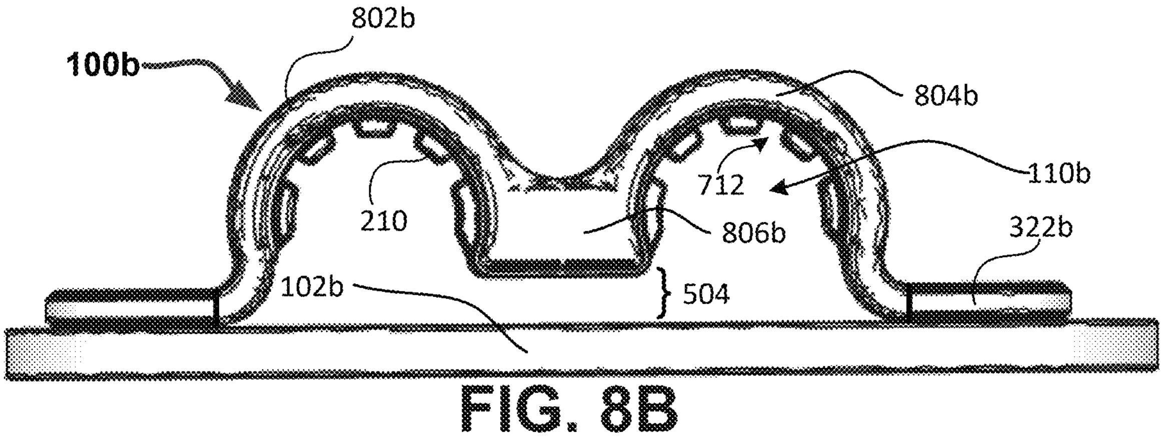
FIG. 8B is a bottom view of a magnetic accessory holder in accordance with some embodiments of the present disclosure.
Figure 9A:
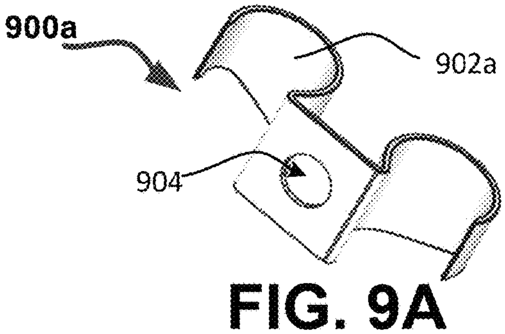
FIG. 9A is a rear perspective view of a conformal layer of a retaining bracket in accordance with some embodiments of the present disclosure.
Figure 10A:
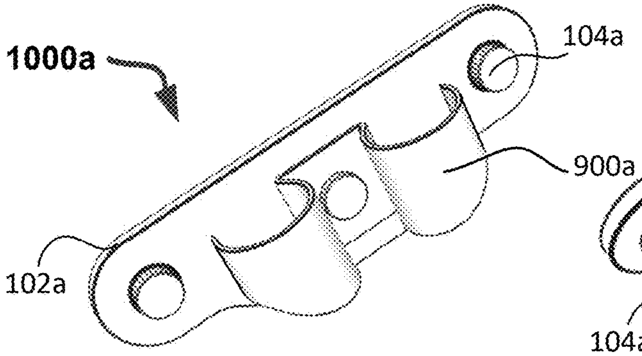
FIG. 10A is a front perspective view depicting a conformal layer of a retaining bracket attached to a back plate in accordance with some embodiments of the present disclosure.
Figure 9B:
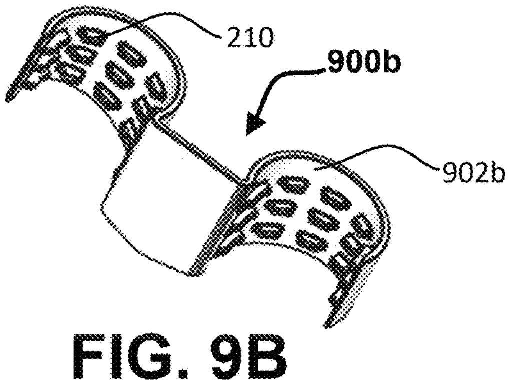
FIG. 9B is a rear perspective view of a conformal layer of a retaining bracket in accordance with some embodiments of the present disclosure.
Figure 10B:
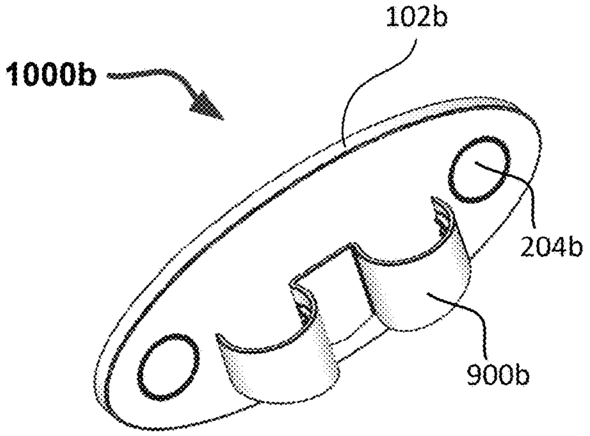
FIG. 10B is a front perspective view depicting a conformal layer of a retaining bracket attached to a back plate in accordance with some embodiments of the present disclosure.

Turning now to FIGS. 7A-8B, FIGS. 7A-7B are respectively a top and a bottom view of a magnetic accessory holder in accordance with some embodiments while FIGS. 8A-8B are respectively a top and a bottom view of a magnetic accessory holder in accordance with the same or other embodiments.

In some of these embodiments, the magnetic accessory holder 100*a*, 100*b* can have a retaining bracket 106*a*, 106*b* that has an outer surface 206*a*, 206*b* and an inner surface 207*a*, 207*b*, each of which has curved and flat portions. Each of the outer surface 206*a*, 206*b* and the inner surface 207*a*, 207*b* can extend between a top surface 704*a*, 704*b* and a bottom surface 804*a*, 804*b* of the retaining bracket 106*a*, 106*b*. The inner surface 207*a*, 207*b* can define one or more elongated channels 108*a*, 108*b* where each elongated channel 108*a*, 108*b* forms a receptacle 110*a*, 110*b* extending from the top surface 704*a*, 704*b* to the bottom surface 804*a*, 804*b* of the retaining bracket 106*a*, 106*b*. Consequently, the depth of the elongated channels 108*a*, 108*b* and of the receptacles 110*a*, 110*b* can be defined by the length or the distance between the top surface 704*a*, 704*b* and the bottom surface 804*a*, 804*b* of the retaining bracket 106*a*, 106*b*. In some of these embodiments, the retaining bracket 106*a*, 106*b* can also include a lip 112*a*, 112*b* extending perpendicularly relative to the length between the top surface 704*a*, 704*b* and the bottom surface 804*a*, 804*b* of the retaining bracket 106*a*, 106*b*.

In the several embodiments, the retaining bracket 106*a*, 106*b* can include a top surface 704*a*, 704*b* and a bottom surface 804*a*, 804*b* as well as an inner surface 207*a*, 207*b* and an outer surface 206*a*, 206*b*. In these embodiments, both the inner surface 207*a*, 207*b* and the outer surface 206*a*, 206*b* can extend between the top surface 704*a*, 704*b* and the bottom surface 804*a*, 804*b*. Furthermore, both the inner surface 207*a*, 207*b* and the outer surface 206*a*, 206*b* can have one or more areas that are curved such that the backing plate 102*a*, 102*b* includes one or more curved surfaces 212*a*, 212*b*. In these embodiments, a portion of the inner surface 207*a*, 207*b* can define one or more concave walls, where each concave wall defines an elongated receptacle 110*a*, 110*b* and extends between the top surface 704*a*, 704*b* and the bottom surface 804*a*, 804*b* of the retaining bracket 106*a*, 106*b*.

In these and other embodiments, the prismoidal receptacles 110*a*, 110*b* can have various shapes that are substantially prismoidal and that conform to the shape of an article that is intended to be held by the holder. For example, in some embodiments, the receptacle 110*a*, 110*b* can be shaped as a rectangular prism or as an octagonal prism. In other embodiments, the receptacle 110*a*, 110*b* can be shaped as a cylindrical prism or as an irregular prismoid (e.g., semi-circular prismoid, prismoid with a crescent cross section, etc.)

In some embodiments the width of the receptacle can be defined by a length or diameter 706. Each receptacle 110*a*, 110*b* can be separated from another receptacle by a portion 806*a*, 806*b* of the retaining bracket 106*a*, 106*b*. Furthermore, while in the depicted embodiments, two receptacles 110*a*, 110*b* can be seen, embodiments of the present invention are contemplated with any number of receptacles (i.e., one or more receptacles) 110*a*, 110*b*. Additionally, in the various embodiments, the distance between the center of one receptacle 110*a*, 110*b* from the center of an adjacent receptacle 110*a*, 110*b* can be defined by a separation length 810. In these or other embodiments, the inner surface 207*a*, 207*b* of the retaining bracket 106*a*, 106*b* can be patterned or textured to have protrusions 210 or grooves 712 along a portion of or the entirety of the inner surface 207*a*, 207*b*. Such patterning or texturing can serve to improve the grip and friction provided by the accessory holder relative to the accessory that is being held. Furthermore, FIGS. 7B and 8B depict embodiments where the portion 806*a*, 806*b* of the retaining bracket 106*a*, 106*b* is separated from a surface of the backing plate 102*a*, 102*b* by the offset distance 504 when the retaining bracket 106*a*, 106*b* is connected to the backing plate 102*a*, 102*b*.

Figure 11A:
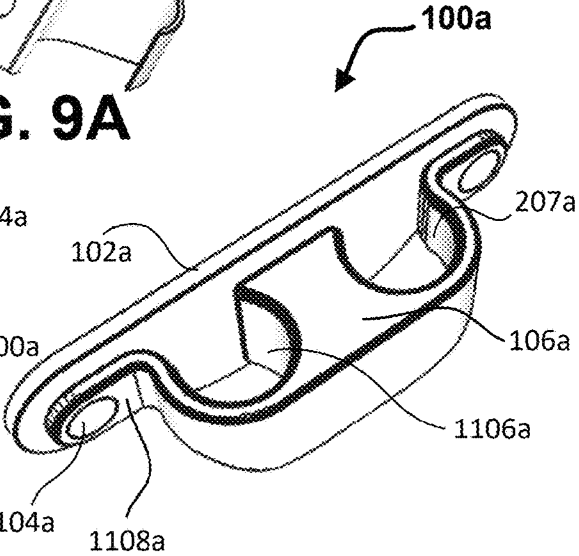
FIG. 11A is a front perspective view of a magnetic accessory holder in accordance with some embodiments of the present disclosure.
Figure 11B:
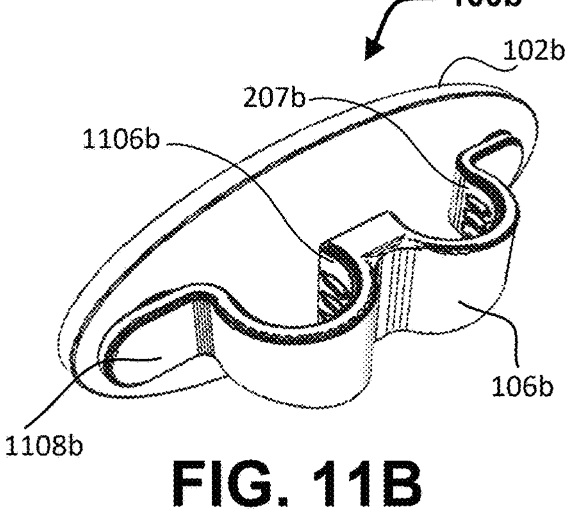
FIG. 11B is a front perspective view of a magnetic accessory holder in accordance with some embodiments of the present disclosure.

With continued reference to FIGS. 1A-8B and turning to FIGS. 9A-11B additional constituent components of an accessory holder 100*a*, 100*b* can be seen. In accordance with some embodiments of the present invention, FIGS. 9A-9B each respectively illustrate a rear perspective view of a conformal layer 900*a*, 900*b* of a retaining bracket 106*a*, 106*b*, FIGS. 10A-10B each illustrate a front perspective view of a partially assembly 1000*a*, 1000*b* of a conformal layer 900*a*, 900*b* of a retaining bracket 106*a*, 106*b* attached to a backing plate 102*a*, 102*b*, while FIGS. 11A-B show a front perspective view of an assembled magnetic accessory holder 100*a*, 100*b*.

Accordingly, some embodiments of the present disclosure can include an accessory holder 100*a*, 100*b* that has a backing plate 102*a*, 102*b*, a first set of magnets 204*a*, 204*b* affixed to the backing plate 102*a*, 102*b*, and a retaining bracket 106*a*, 106*b* with a body having multiple flat surfaces 214*a* and multiple curved surfaces 212*a* disposed along the body (i.e., retaining bracket body) 802*a*, 802*b*. The retaining bracket 106*a*, 106*b* can also include a conformal layer 900*a*, 900*b* attached to, attached along, or forming the inner surface 207*a*, 207*b* of the retaining bracket. In these and other embodiments the conformal layer 900*a*, 900*b* can include a smooth surface 902*a*, a textured surface 902*b*, or both a smooth surface 902*a* and a textured surface 902*b*.

The curved and flat surfaces can be disposed along the retaining bracket body 802*a*, 802*b* and the conformal layer 900*a*, 900*b* such that a curved surface 212*a*, 212*b* alternates with a flat surface 214*a*, 214*b* along the length of the body 802*a*, 802*b* of the retaining bracket 106*a*, 106*b*. In these and other embodiments each curved surface 212*a*, 212*b* can be a part of a curved wall 1106*a*, 1106*b* and can define a partially open tubular channel 108*a*, 108*b* forming a receptacle 110*a*, 110*b* configured to receive a protruding portion of an accessory.

In some embodiments, the accessory holder 100*a*, 100*b* can include a second set of magnets affixed to the retaining bracket 106*a*, 106*b*, where each magnet 104*a*, 104*b* of the second set of magnets is respectively aligned with a corresponding magnet 204*a*, 204*b* of the first set of magnets to fasten the retaining bracket 106*a*, 106*b* to the backing plate 102*a*, 102*b* by magnetic attraction through a layer of intervening material. In some embodiments, at least two flat surfaces 214*a*, 214*b* of the retaining bracket body 802*a*, 802*b* (i.e., the body of the retaining bracket) each respectively extend along a portion of a lip 112*a*, 112*b* extending away from an exterior curved surface 212*a*, 212*b* of the body 802*a*, 802*b* of the retaining bracket 106*a*, 106*b* away from a longitudinal axis of the partially open tubular channel 108*a*, 108*b* formed by an interior curved surface 212*a*, 212*b* of the retaining bracket 106*a*, 106*b*. In these or other embodiments, each curved surface 212*a*, 212*b* can be a smooth surface 902*a* or textured surface 902*b* that is textured or patterned with grooves 712 or protrusions 210. Furthermore, the conformal layer 900*a*, 900*b* can include one or more apertures 904*a* configured to receive or conform to the shape of a magnet 104*a* of the second set of magnets.

Figure 12A:
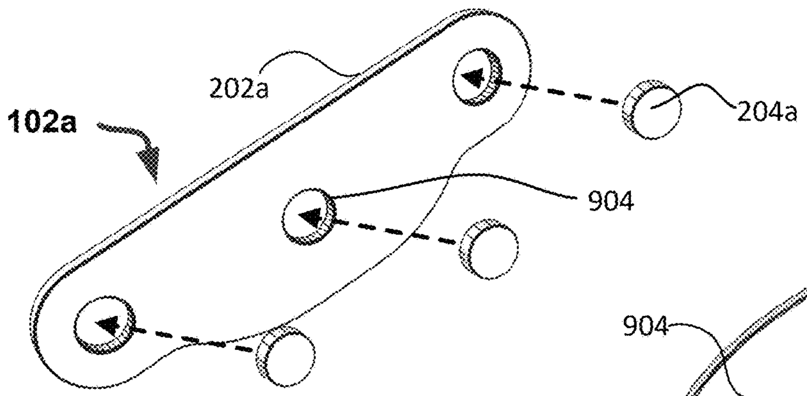
FIG. 12A is a front perspective view of a backing plate with empty apertures in accordance with some embodiments of the present disclosure.
Figure 12B:
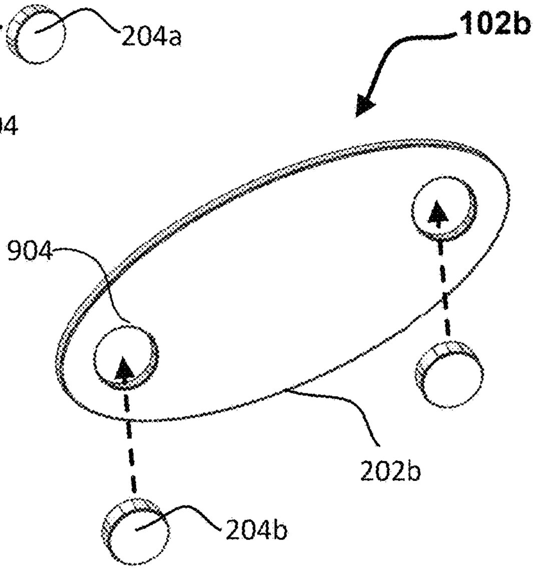
FIG. 12B is a front perspective view of a backing plate with empty apertures in accordance with some embodiments of the present disclosure.
Figure 13A:
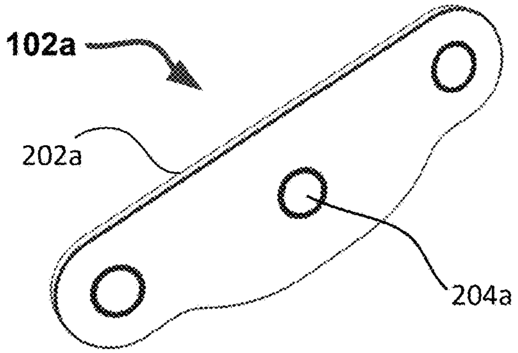
FIG. 13A is a front perspective view of a backing plate with embedded magnets in accordance with some embodiments of the present disclosure.
Figure 13B:
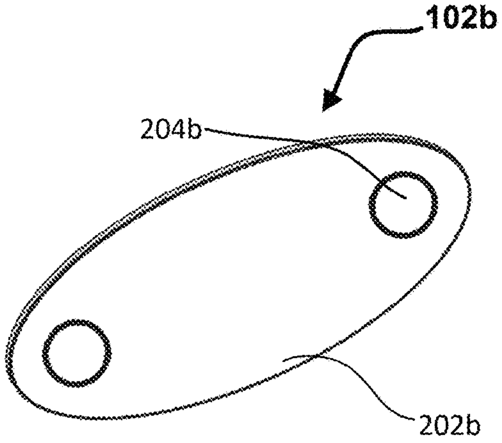
FIG. 13B is a front perspective view of a backing plate with embedded magnets in accordance with some embodiments of the present disclosure.
Figure 14:
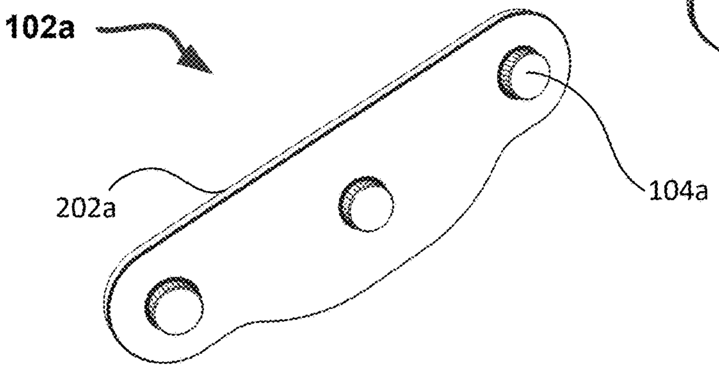
FIG. 14 is front perspective view of a backing plate with a set of embedded magnets connected to a corresponding set of magnets in accordance with some embodiments of the present disclosure.

With continued reference to FIGS. 9A-11B, FIGS. 12A-14 views of backing plate bodies 202*a*, 202*b* are depicted. FIGS. 12A-12B each respectively show a front perspective view of a backing plate with empty apertures 904 in accordance with some embodiments, while FIGS. 13A, 13B, and 14 each respectively illustrate a front perspective view of a backing plate with embedded or attached magnets in accordance with the several embodiments.

Each backing plate 102*a*, 102*b* can have one or more apertures 904 that are configured (i.e., correspondingly shaped) to receive or to fit a corresponding magnet 204*a*, 204*b* of the first set of magnets. Each of the various embodiments of the present invention can have a backing plate 102*a*, 102*b* with a different number of apertures 904. Consequently, each backing plate 102*a*, 102*b* can have a different corresponding number of magnets 204*a*, 204*b* that are to fit into the apertures. In some embodiments, the magnets 204*a*, 204*b*, once inserted or embedded in the backing plate 102*a*, 102*b*, can be dimensioned such that no portion of the magnet 204*a*, 204*b* extends beyond either of the exposed surfaces of the backing plate 102*a*, 102*b* and such that the exposed surface of each magnet 204*a*, 204*b* is flush with the exposed surface of the backing plate 102*a*, 102*b*. Various embodiments with any number of magnets 204*a*, 204*b* disposed within or along a backing plate 102*a*, 102*b* are contemplated by the present disclosure. The distribution of apertures 904 on the body 202*a*, 202*b* of the backing plate 102*a*, 102*b* and, consequently, the distribution of magnets 204*a*, 204*b* within the backing plate 102*a*, 102*b* or on the backing plate 102*a*, 102*b* can vary among the various embodiments disclosed herein.

Figure 15:
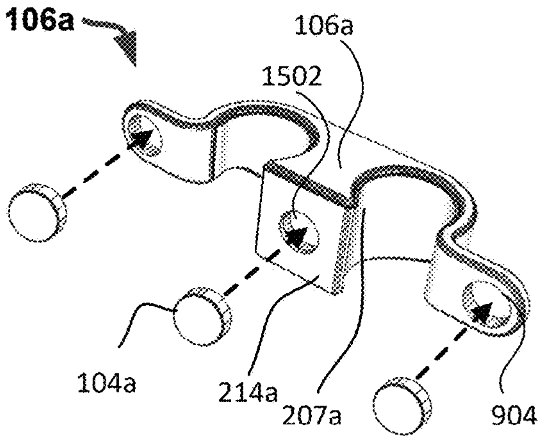
FIG. 15 is a rear perspective view of a retaining bracket in accordance with some embodiments of the present disclosure.
Figure 16A:
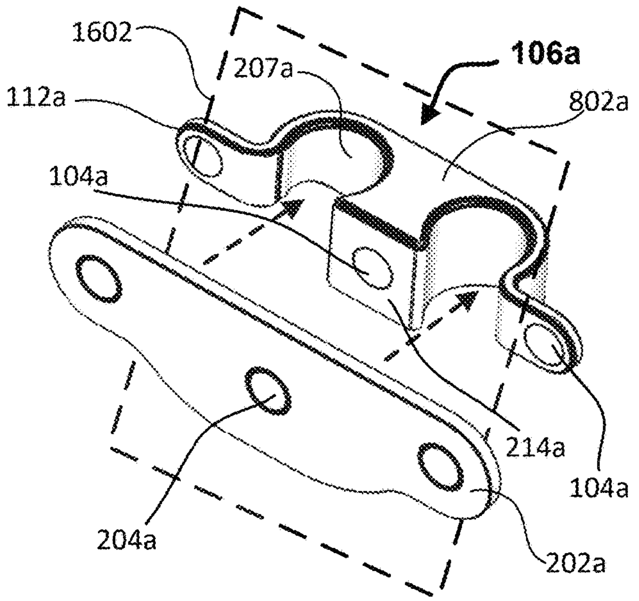
FIG. 16A is a rear perspective view of a backing plate being attached to a retaining bracket through an intervening layer of material (e.g., fabric, clothing) in accordance with some embodiments of the present disclosure.
Figure 16B:
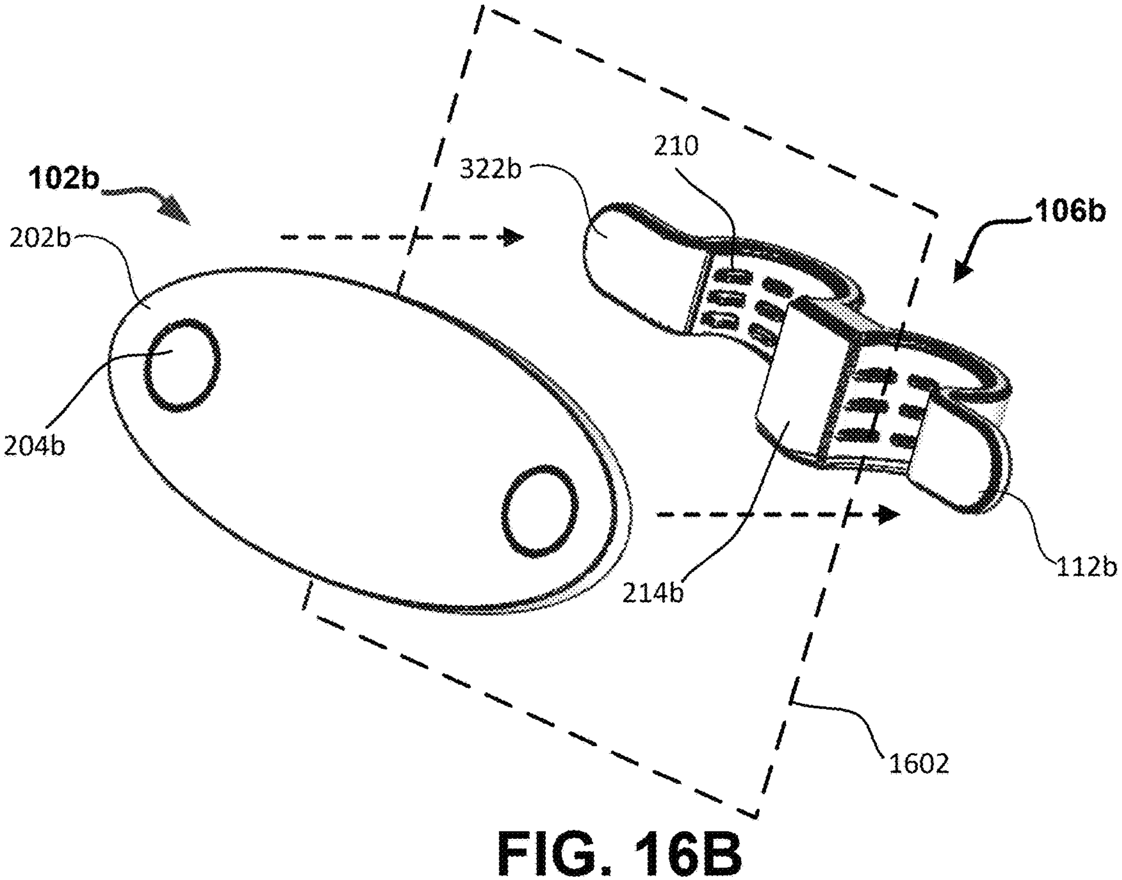
FIG. 16B is a rear perspective view of a backing plate being attached to a retaining bracket through an intervening layer of material (e.g., fabric, clothing) in accordance with some embodiments of the present disclosure.

FIG. 15 shows a rear perspective view of a retaining bracket 106*a* in accordance with some embodiments, while FIGS. 16A-16B each respectively illustrate a rear perspective view of a backing plate body 202*a*, 202*b* being attached to a retaining bracket 106*a*, 106*b* through an intervening layer 1602 of material (e.g., fabric, clothing) in accordance with some embodiments. In some embodiments, each magnet 104*a* of the second set of magnets can be inserted or embedded in a corresponding aperture 904 within the retaining bracket 106*a*. One or more apertures 904 or cavities 1502 (within which a magnet can be embedded) can each be formed within a flat surface 214*a*, 214*b* or in a lip 112*a*, 112*b* of the retaining bracket 106*a*, 106*b*.

In some embodiments, the retaining bracket 106*a*, 106*b* of the magnetic accessory holder 100*a*, 100*b* can include a second set of magnets, where a magnet 104*a*, 104*b* in the second set of magnets can be positioned to align with at least one magnet 204*a*, 204*b* of the first set of magnets. In these embodiments, each magnet 204*a*, 204*b* can be at least partially embedded in the body 202*a*, 202*b* of the backing plate 102*a*, 102*b*. In other embodiments, each magnet 204*a*, 204*b* can be fully embedded in the body 202*a*, 202*b* of the backing plate 102*a*, 102*b* such that each magnet's surface is flush with a surface of the backing plate. In yet other embodiments, each magnet 204*a*, 204*b* can be affixed onto the surface of the body 202*a*, 202*b* of the backing plate 102*a*, 102*b* such that each magnet extends away from an exposed surface of the of the body 202*a*, 202*b* of the backing plate 102*a*, 102*b* and toward the retaining bracket 106*a*, 106*b* when the magnetic accessory holder 100*a*, 100*b* is in assembled form.

The magnets 204*a*, 204*b* of the first set of magnets on the backing plate 102*a*, 102*b* can be positioned to align with the magnets 104*a*, 104*b* of the second set of magnets on the retaining bracket 106*a*, 106*b*. In other embodiments, magnets 204*a*, 204*b* of the first set of magnets on the backing plate 102*a*, 102*b* can be positioned to align with the tabs 322*b* and other magnetized areas on the retaining bracket 106*a*, 106*b*. The aligned sets of magnets (or magnetized areas) can fasten the retaining bracket 106*a*, 106*b* to the backing plate 102*a*, 102*b* by magnetic attraction and secure the magnetic accessory holder 100*a*, 100*b* on an intervening layer 1602 of material (such as on an item of clothing).

In the various embodiments, a magnet 104*a*, 104*b* of the second set of magnets can either be partially embedded in a tab 322*a*, 322*b* or attached on a surface of the tab 322*a*, 322*b* such that the magnet 104*a*, 104*b* extends beyond the surface of the tab 322*a*, 322*b*. Each tab 322*a*, 322*b* can respectively form a part of a corresponding lip 112*a*, 112*b* and can respectively be positioned to align with a corresponding magnet 204*a*, 204*b* of the first set of magnets on the substantially flat backing plate to fasten the retaining bracket 106*a*, 106*b* to the backing plate 102*a*, 102*b* by magnetic attraction and secure the magnetic accessory holder 100*a*, 100*b* on an intervening layer 1602 of material (such as on an item of clothing).

Figure 17:
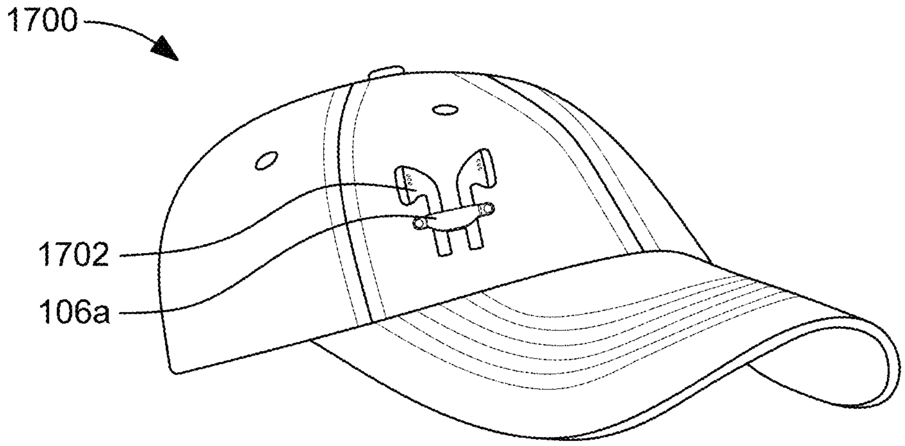
FIG. 17 is a front perspective view of a magnetic accessory holder holding a pair of earbuds attached to a hat in accordance with some embodiments of the present disclosure.
Figure 18:
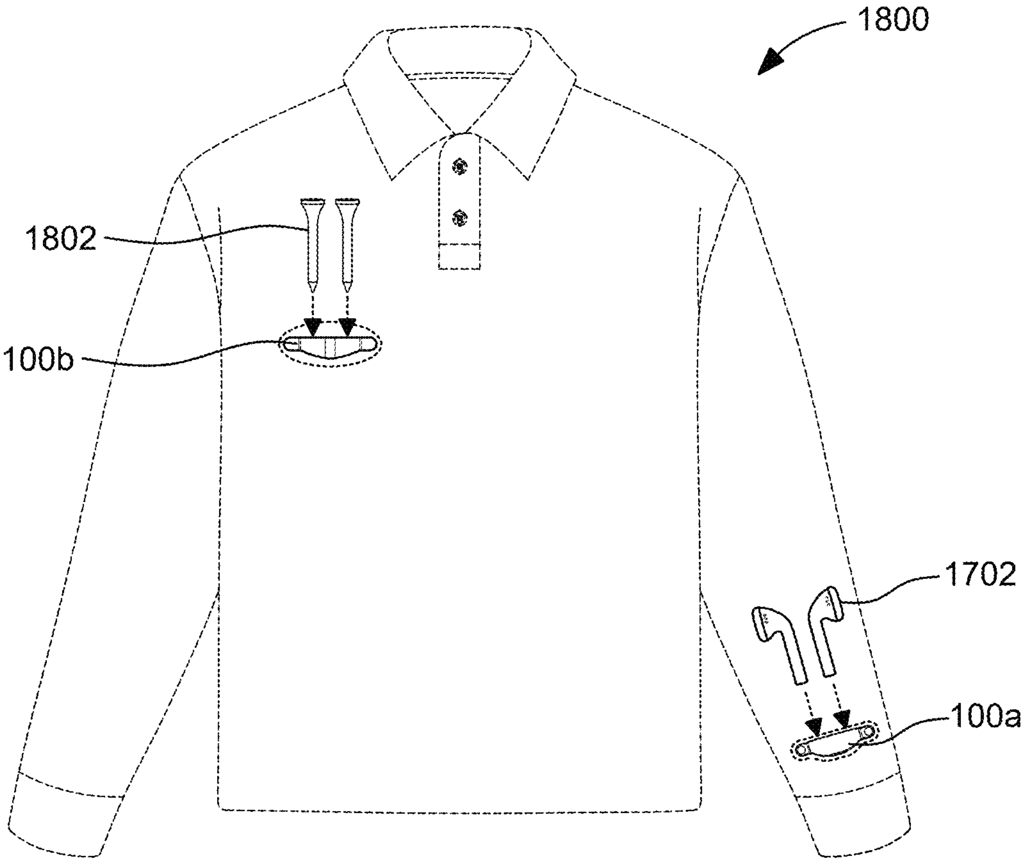
FIG. 18 is a front view of a magnetic accessory holder holding a pair of golf tees attached to a chest portion of a shirt and a magnetic accessory holder holding a pair of earbuds attached to a sleeve portion of the shirt in accordance with some embodiments of the present disclosure.

FIG. 17 shows a front perspective view of a magnetic accessory holder holding a pair of earbuds 1702 attached to a hat 1700, while FIG. 18 depicts a front view of a magnetic accessory holder 100*b* holding a pair of golf tees attached to a chest portion of a shirt and a magnetic accessory holder 100*a* holding a pair of earbuds 1702 attached to a sleeve portion of the shirt 1800 in accordance with some embodiments of the present disclosure. The retaining bracket 106*a* holds the earbuds 1702 firmly in place against the intervening layer of the hat 1700 by magnetic attraction to the backing plate which is not visible. Accessories, such as golf tees 1802 and earbuds 1702 can easily and conveniently be inserted, retained, and removed from the receptacles of the magnetic accessory holder 100*a*, 100*b*.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A magnetic accessory holder comprising:

a backing plate comprising an elongated body, wherein the backing plate is a substantially flat elongated plate separate from a retaining element, wherein a first set of magnets is at least partially embedded in the body of the backing plate;

wherein the retaining element is a retaining bracket comprising:

an outer surface and an inner surface, each of the outer surface and the inner surface extending between a top surface and a bottom surface of the retaining bracket, wherein the inner surface defines a plurality of elongated channels, each elongated channel forming a receptacle extending from the top surface to the bottom surface of the retaining bracket, wherein each receptacle is separated from another receptacle by a portion of the retaining bracket; and a second set of magnets, wherein each magnet in the second set of magnets is positioned to align with at least one magnet of the first set of magnets at least partially embedded in the body of the backing plate to fasten the retaining bracket to the backing plate by magnetic attraction, and wherein each receptacle is configured to receive a protruding portion of an electronics accessory, and wherein each receptacle is shaped as a partially open cylindrical tube having a concave wall portion occupying a greater circumferential extent than a longitudinal access opening.

2. The magnetic accessory holder of claim 1, wherein each receptacle is shaped as a partially open cylindrical tube having a depth defined by a distance between the top surface and the bottom surface of the retaining bracket.

3. The magnetic accessory holder of claim 1 wherein each receptacle is separated from another receptacle by a separating portion of the retaining bracket, wherein the separating portion comprises a substantially flat surface parallel to the backing plate.

4. The magnetic accessory holder of claim 3, wherein, in a cross-section transverse to the receptacle, each receptacle includes a continuous concave wall portion and a longitudinal access opening defined between opposed ends of the concave wall portion, the concave wall portion occupying a greater circumferential extent than the access opening, wherein the longitudinal access opening faces the backing plate when the retaining bracket is fastened to the backing plate.

5. The magnetic accessory holder of claim 1, wherein the retaining bracket further comprises a lip extending perpendicularly relative to a length between the top surface and the bottom surface such that both the inner surface of the lip and the inner surface of the portion of the retaining bracket are parallel to the backing plate.

6. The magnetic accessory holder of claim 5, wherein at least one magnet of the second set of magnets is embedded in the lip.

7. The magnetic accessory holder of claim 1, wherein a portion of the inner surface of the retaining bracket disposed along a concave wall of a receptacle comprises a textured surface.

8. A magnetic accessory holder comprising:

a substantially flat backing plate comprising an elongated body, wherein the substantially flat backing plate is a separate component from a retaining element and is configured to secure the retaining element to an item of clothing;

a first set of magnets comprising at least one magnet that is at least partially embedded in the body of the substantially flat backing plate, the at least one magnet having a regular geometric shape; and wherein the retaining element is a retaining bracket configured to magnetically attach to the substantially flat backing plate through a layer of intervening material, the retaining bracket comprising:

a top surface;

a bottom surface;

an outer surface extending between the top surface and the bottom surface, wherein the outer surface comprises a plurality of curved areas;

an inner surface extending between the top surface and the bottom surface, wherein a portion of the inner surface defines a plurality of concave walls, each concave wall defining an elongated receptacle shaped as a partially open cylindrical tube having a concave wall portion occupying a greater circumferential extent than a longitudinal access opening, and extending between the top surface and the bottom surface; and a plurality of tabs, each tab respectively extending from an end of a corresponding curved area of the outer surface such that the inner surface of the tab is substantially flat and parallel to the inner surface of a portion of the retaining bracket that separates a first elongated receptacle from a second elongated receptacle, wherein each tab comprises magnetic material and each tab is respectively positioned to align with a corresponding magnet of the first set of magnets on the substantially flat backing plate to fasten the retaining bracket to the backing plate by magnetic attraction, and wherein each receptacle is configured to receive and retain a protruding stem portion of a sport accessory.

9. The magnetic accessory holder of claim 8, wherein each receptacle is shaped as a prismoidal partially open tube having a non-circular cross-section.

10. The magnetic accessory holder of claim 9, wherein each receptacle has a shape selected from the group consisting of a rectangular prism, an octagonal prism, a semi-circular prismoid, and a prismoid having a crescent cross-section.

11. The magnetic accessory holder of claim 8, further comprising:

a second set of magnets, wherein a magnet of the second set of magnets is respectively attached to a corresponding tab of the retaining bracket and protrudes perpendicularly relative to the inner surface.

12. The magnetic accessory holder of claim 8, wherein each tab is a magnet.

13. The magnetic accessory holder of claim 8, wherein the retaining bracket further comprises a conformal layer attached along the inner surface of each concave wall defining a corresponding receptacle and along the portion of the retaining bracket that separates the first elongated receptacle from the second elongated receptacle of the retaining bracket.

14. The magnetic accessory holder of claim 13, wherein the conformal layer comprises at least one textured surface.

15. The magnetic accessory holder of claim 8, wherein the sport accessory is an earbud or a golf tee.

16. An accessory holder comprising:

a backing plate comprising an elongated body, wherein the backing plate is configured to secure a retaining element to an item of clothing;

a first set of magnets at least partially embedded in the elongated body of the backing plate;

wherein the retaining element is a retaining bracket comprising a body having a plurality of flat surfaces and a plurality of curved surfaces forming an inner surface of the body such that each curved surface of the plurality of curved surfaces is adjacent to a flat surface of the plurality of flat surfaces on at least two sides of the curved surface along a length of the body of the retaining bracket, and wherein each curved surface defines a partially open cylindrical tube receptacle having a continuous concave wall portion occupying a greater circumferential extent than a longitudinal access opening, the receptacle configured to receive and retain a protruding stem portion of an accessory including an earbud or golf tee; and a second set of magnets affixed to the retaining bracket, wherein each magnet of the second set of magnets is respectively aligned with a corresponding magnet of the first set of magnets to fasten the retaining bracket to the backing plate by magnetic attraction through a layer of intervening material.

17. The accessory holder of claim 16, wherein the accessory is selected from the set comprising a wireless earbud, a golf tee, a screwdriver, pliers, a writing utensil, and a dining utensil.

18. The accessory holder of claim 16, wherein each curved surface is textured with grooves or protrusions along a concave wall of a corresponding receptacle.

19. The accessory holder of claim 16, wherein at least two flat surfaces of the plurality of flat surfaces of the body of the retaining bracket each respectively extend along a portion of a lip extending away from an exterior curved surface of the body of the retaining bracket away from a longitudinal axis of the partially open tubular channel formed by an interior curved surface.

20. The accessory holder of claim 16, wherein a longitudinal cross section of each magnet is formed in a shape selected from the set comprising a circle, an oval, a star, a regular polygon, and an irregular polygon.

* * * * *